(12) United States Patent
Van Hove et al.

(10) Patent No.: US 11,629,715 B2
(45) Date of Patent: Apr. 18, 2023

(54) TRANSMISSION AND COMPRESSOR OR VACUUM PUMP PROVIDED WITH SUCH A TRANSMISSION

(71) Applicant: ATLAS COPCO AIRPOWER, NAAMLOZE VENNOOTSCHAP, Wilrijk (BE)

(72) Inventors: Linus Van Hove, Wilrijk (BE); Steven De Man, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 580 days.

(21) Appl. No.: 16/603,852

(22) PCT Filed: Mar. 13, 2018

(86) PCT No.: PCT/IB2018/051661
§ 371 (c)(1),
(2) Date: Oct. 9, 2019

(87) PCT Pub. No.: WO2018/203151
PCT Pub. Date: Nov. 8, 2018

(65) Prior Publication Data
US 2020/0116233 A1    Apr. 16, 2020

Related U.S. Application Data

(60) Provisional application No. 62/501,245, filed on May 4, 2017.

(30) Foreign Application Priority Data

Jan. 24, 2018   (BE) .................................. 2018/5038

(51) Int. Cl.
*F01C 1/04*    (2006.01)
*F01C 1/06*    (2006.01)
(Continued)

(52) U.S. Cl.
CPC .............. *F04C 29/12* (2013.01); *F04B 53/00* (2013.01); *F04C 18/08* (2013.01);
(Continued)

(58) Field of Classification Search
CPC ...... F04C 29/12; F04C 29/005; F04C 29/028; F04C 2240/30; F04C 18/16; F01C 1/04; F01C 1/16
See application file for complete search history.

(56) References Cited

U.S. PATENT DOCUMENTS 4,632,650 A  * 12/1986 Frieden ................. F04C 29/026
                                                  96/201
5,011,388 A  * 4/1991 Aoki ..................... F04C 29/026
                                                  184/6.24
(Continued)

FOREIGN PATENT DOCUMENTS

CN        205606795 U     9/2016
EP         0200152 A2    11/1986
(Continued)

OTHER PUBLICATIONS

International Search Report and Written Opinion PCT Application No. PCT/IB2018/051661, dated Jun. 19, 2018.

*Primary Examiner* — Deming Wan
(74) *Attorney, Agent, or Firm* — Bacon & Thomas, PLLC

(57) ABSTRACT

A transmission between a drive shaft and a driven shaft comprises a housing and at least a driven gearwheel that is mounted on the driven shaft and a drive gearwheel that is mounted on a drive shaft. The housing comprises two separated chambers, i.e. a first chamber that is connected to the driven shaft and a second chamber which is separate from the first chamber, whereby the first chamber is connected via a channel with the second chamber, whereby around the drive gearwheel or driven gearwheel the second chamber is formed, whereby the form of the second chamber (Continued)

is such that when the gearwheel in question rotates, a gas flow is created around this gearwheel which causes a negative pressure in the channel by the venturi effect.

10 Claims, 2 Drawing Sheets

(51) Int. Cl.
| | | |
|---|---|---|
| *F04C 29/02* | (2006.01) | |
| *F04C 29/00* | (2006.01) | |
| *F04C 29/12* | (2006.01) | |
| *F04B 53/00* | (2006.01) | |
| *F16H 37/02* | (2006.01) | |
| *F04C 18/08* | (2006.01) | |

(52) U.S. Cl.
CPC ........ *F04C 29/0042* (2013.01); *F04C 29/026* (2013.01); *F16H 37/02* (2013.01); *F04C 2240/30* (2013.01)

(56) References Cited

U.S. PATENT DOCUMENTS

| | | | | |
|---|---|---|---|---|
| 6,612,820 | B1* | 9/2003 | Staat | F04C 27/009 |
| | | | | 418/104 |
| 8,702,409 | B2* | 4/2014 | Cavatorta | F04C 18/084 |
| | | | | 418/201.3 |
| 2012/0257997 | A1* | 10/2012 | Morita | F04C 29/005 |
| | | | | 417/415 |
| 2013/0025405 | A1 | 1/2013 | Arisawa et al. | |

FOREIGN PATENT DOCUMENTS

| | | |
|---|---|---|
| EP | 0812988 A1 | 12/1997 |
| EP | 1892204 A1 | 2/2008 |
| JP | H05209594 A | 8/1993 |
| JP | 2004068658 A | 3/2004 |
| JP | 2011012805 A | 1/2011 |
| JP | 2012132374 A | 7/2012 |
| WO | 8303641 A1 | 10/1983 |
| WO | 0042322 A1 | 7/2000 |
| WO | 2016136482 A1 | 9/2016 |

* cited by examiner

TRANSMISSION AND COMPRESSOR OR VACUUM PUMP PROVIDED WITH SUCH A TRANSMISSION

The present invention relates to a transmission and a compressor or vacuum pump provided with such transmission.

BACKGROUND OF THE INVENTION

It is known that a transmission between a drive shaft of a motor and the driven shaft of, for example, a rotor of a compressor element, is provided with a housing in which the gearwheels of the transmission are located.

In order to ensure a proper operation, oil is injected in the housing of the transmission to serve as lubricant.

As the driven shaft runs from the compressor element to the transmission, seals are provided between the compressor element and the transmission.

However, there will always be some leakage flow, which means some air will end up in the housing of the transmission thus causing a pressure build-up in the transmission.

It is important to get rid of such positive pressure as said seals should not be exposed to too big a pressure difference because this can affect their proper operation.

If the pressure difference is too great it is possible that air will leak from the transmission to the compressor element. This air will also contain the injected lubricant.

Such situation needs to be avoided at all times, as this lubricant will unintentionally end up in the compressor element and cause the compressed air generated by the compressor element, to be polluted in this case with the lubricant.

Certainly, in the case of oil-free applications whereby pure compressed air is required, such situation is not tolerable.

The positive pressure could be let off into the atmosphere. This means that air with the lubricant ends up in the atmosphere. Such situation is preferably to be avoided for oil-free applications, as this lubricant will end up on or near the machine, and in so doing may accidentally also end up in the machine.

This is why the housing of the transmission is connected with an oil separator, to be able to purify the oil-air mixture in the transmission via the oil separator and to let it off into the atmosphere. The separated oil can be channeled back to an oil reservoir, to subsequently be injected back into the transmission.

In the known transmissions, use is made of compressed gas to obtain extraction from the transmission to the oil separator via a venturi channel.

Part of the compressed gas generated by the compressor is used for this which is branched off to said venturi channel. Consequently, the oil-air mixture will be extracted from the transmission, whereby the compressed gas and the oil-air mixture are blown through a filter.

Naturally this implies a loss of efficiency of the machine.

Moreover, the branch can be interrupted or detach, such that the venturi channel loses its effect, such that no extraction to the oil separator takes place.

Alternatively, it is also possible to obtain extraction via an external (electrical) source with, for example, a ventilator.

However, this solution also implies an extra consumption of electricity, and also an additional risk if the external source fails, for example, in case of a power failure or break in the cable.

SUMMARY OF THE INVENTION

The purpose of the present invention is to provide a solution for at least one of said and other disadvantages.

To this end, the invention relates to a transmission between a drive shaft and a driven shaft, which transmission comprises a housing and at least a driven gearwheel that is mounted on the driven shaft and a drive gearwheel that is mounted on a drive shaft, whereby the housing comprises two separated chambers, i.e. a first chamber that is connected to the driven shaft and a second chamber which is separate from the first chamber, whereby the first chamber is connected via a channel with the second chamber, whereby around the drive gearwheel or driven gearwheel the second chamber is formed, whereby the form of the second chamber is such that when the gearwheel in question rotates, a gas flow is created around this gearwheel which causes a negative pressure in the channel by the venturi effect.

Said gas flow around the gearwheel is also called "gearwind" and is an air flow or vortex that is generated by the rotating teeth of the gearwheel.

"The first chamber is connected with the driven shaft", means that this chamber is located on the side of the driven shaft, such that said leak flows end up in this chamber.

A first advantage is that, because a negative pressure is created in the channel, an extraction of gas and any lubricant will take place as it were from said first chamber through the channel to the second chamber.

This provides the advantage that because of this the pressure in the first chamber can be kept low, at a slight positive or negative pressure, within the limits of the pressure difference over the seals between the compressor element and the transmission.

In the second chamber, where the gas and the lubricant of the first chamber end up, there will be a pressure build-up.

Another major advantage is that this system does not require any external power source, i.e. compressed air or electricity.

This also means there is no risk of failure or defect by a shut-down of this external power source.

Furthermore, it is an automatic self-regulating system: the faster the gearwheels rotate, the more leakage flow there will be from the compressor element to the transmission, and the extraction of the first chamber will be greater the faster the gearwheels rotate.

This means that the level of extraction of the first chamber will automatically adapt itself to the situation.

Preferably the gearwheels and the housing form a tight fit, to minimise the leak path between the first chamber and the second chamber as much as possible and to thus create a sufficiently big pressure difference between both chambers.

Preferably, the distance in a radial direction between the wall of the second chamber and the gearwheel in question is also greater in the rotation direction of the gearwheel in question.

This will help to guide the "gearwind" generated by the gearwheel to thus increase the negative pressure in said channel.

In a practical embodiment the second chamber in the housing described above extends from 0° to 225° of the circumference of the gearwheel in question departing from the position of engagement of the gearwheels.

The embodiment described above minimises the vortex losses, such that the power required for the pressure build-up in the second chamber is compensated, and the venturi effect in the channel is maximised to guarantee the negative pressure in the first chamber.

The invention also relates to a compressor or vacuum pump that is provided with a compressor or vacuum pump element and a motor to power the compressor or vacuum pump element and whereby the compressor or the vacuum pump element is also provided with a transmission according to the invention between a drive shaft of the motor and a driven shaft of the compressor or vacuum pump element.

BRIEF DESCRIPTION OF THE DRAWINGS

With the intention of better showing the characteristics of the invention, a few preferred embodiments of a transmission according to the invention and a compressor or vacuum pump equipped with it are described hereinafter by way of an example, without any limiting nature, with reference to the accompanying drawings, wherein.

DETAILED DESCRIPTION OF THE INVENTION

Figure 1:
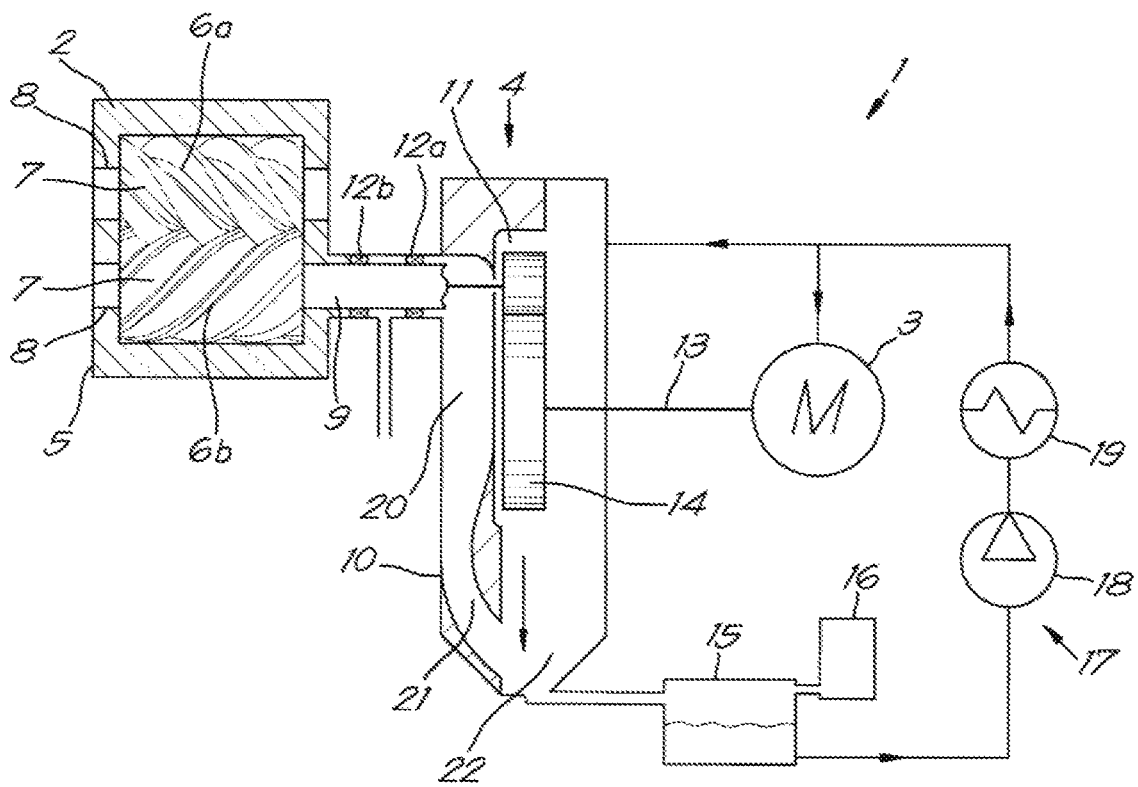
FIG. 1 schematically shows a compressor according to the invention.

The compressor 1 shown in FIG. 1 essentially comprises a compressor element 2, a motor 3 and a transmission 4 between the compressor element 2 and the motor 3.

The compressor element 2 is in this case a screw compressor element 2, which comprises a compressor element housing 5 and two co-operating screw rotors 6a, 6b, more specifically a male screw rotor 6a and a female screw rotor 6b, the lobes 7 of which turn into each other co-operatively.

Both rotors 6a, 6b are mounted with bearings by means of their shaft 6 in the compressor element housing 5.

The shaft 8 of one of the rotors 6b is extended and forms the driven shaft 9.

This driven shaft 9 reaches into the housing 10 of the transmission 4, and the driven gearwheel 11 is mounted at the end of it.

In order to close off the compressor element 2 from the transmission 4, two seals 12a, 12b are mounted on the driven shaft 9: an oil seal 12a and an air seal 12b.

The motor 3 has a drive shaft 13 that reaches into the housing 10 of the transmission 4 and on which a drive gearwheel 14 is mounted that engages on said driven gearwheel 11.

The transmission 4 comprises the aforementioned housing 10 with said gearwheels 11 and 14 therein.

Of course, it is not excluded that in the housing 10 additional gearwheels are mounted between the driven gearwheel 11 and the drive gearwheel 14.

Nor does this exclude that the motor 3 is located in the housing 10 of the transmission 4.

A filter element 16 is connected to the housing 10 of the transmission 4, to be able to filter oil out of the oil-air mixture that is in the housing 10 of the transmission 4.

In this case, but not necessarily, the housing 10 of the transmission A is connected to an oil reservoir 15 to collect the injected oil and this oil reservoir 15 is provided with a filter element 16.

Furthermore, the compressor 1 in the shown example is also provided with an oil circuit 17, which can return the oil collected in the oil reservoir 15 with an oil pump 18, i.e. the oil that flows back out of the housing 10 and the oil separated by the filter element 16, back to the transmission 4 and/or the motor 3. Additionally, the oil circuit 17 is also provided with an oil filter 19 to be able to remove impurities from the oil.

According to the invention the housing 10 of the transmission 4 comprises two chambers 20 and 22. A first chamber 20 which is connected to the driven shaft 9 and a second chamber 22 which is separate from the first chamber 20. This is shown in FIG. 2.

Figure 2:
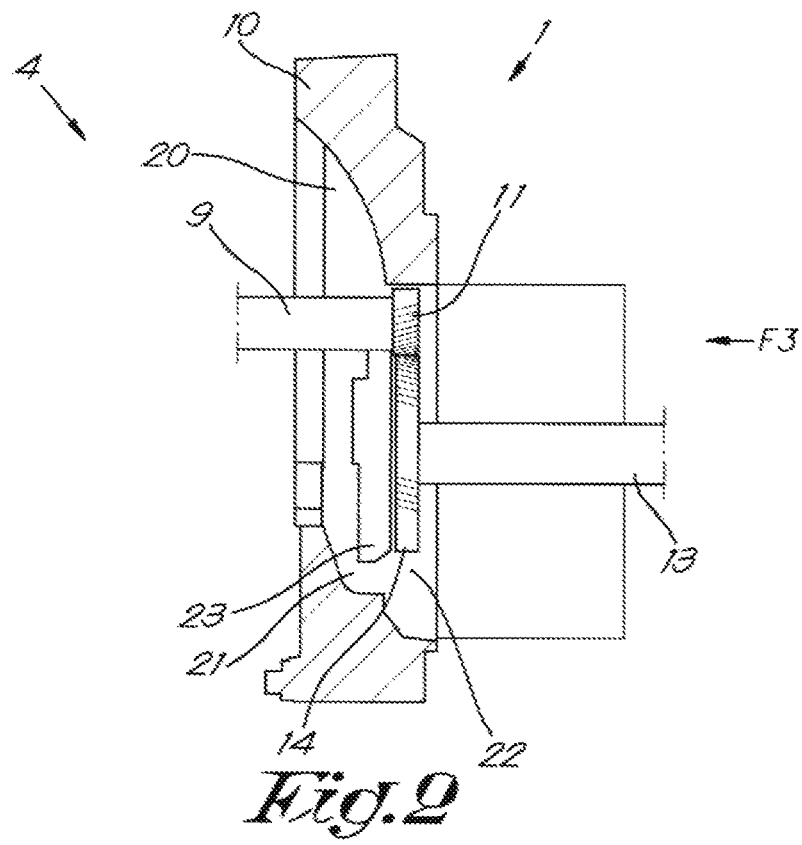
FIG. 2 shows the transmission of FIG. 1 in detail.

As one can tell from FIG. 2, the driven shaft 9 extends into the first chamber 20.

The second chamber 22 is provided around the drive gearwheel 14. The first chamber 20 is connected to this second chamber 22 via the channel 21.

Figure 3:
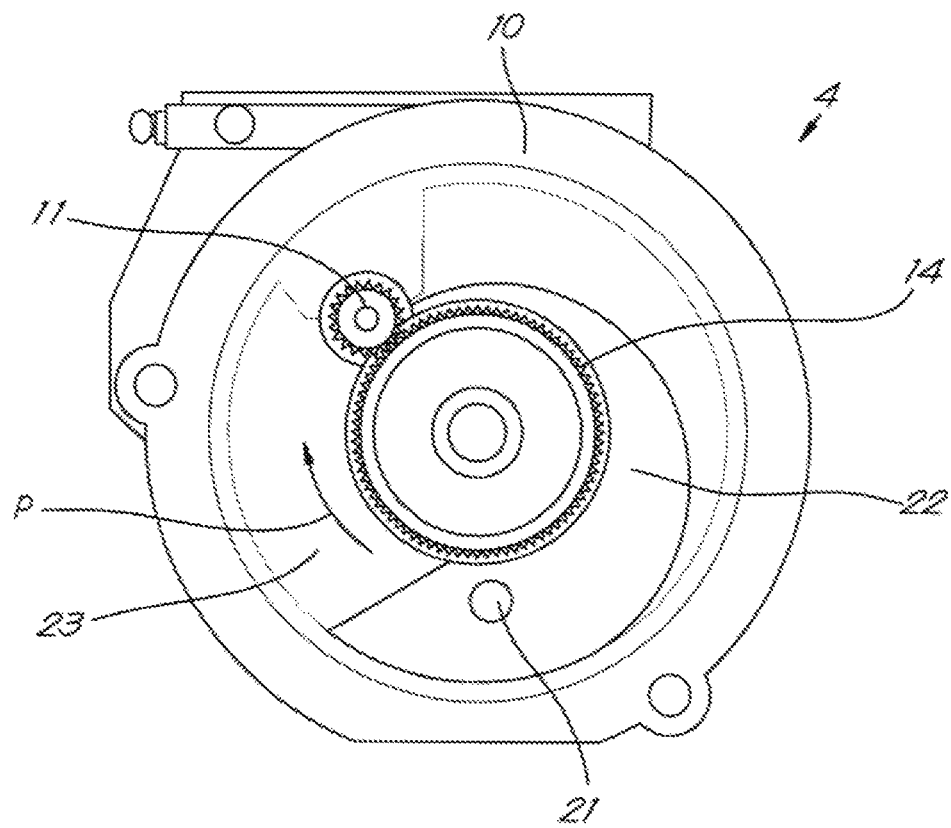
FIG. 3 shows a view according to the arrow F3 in FIG. 2.

The form of the second chamber 22 is shown clearly in FIG. 3.

In this case, the second chamber 22 is integrated in the wall 23 of the housing 10 of the transmission 4.

However, if is also possible that the transmission 4 is provided with a shield that is mounted next to, around or against the gearwheel 14 and that is provided with a form similar to the second chamber 22. Such shield can be mounted in the housing 10. This provides the advantage that nothing needs to be changed to a possible existing housing 10.

The second chamber 22 is such that the "gearwind" that is created by rotation of the drive gearwheel 14 is led along the channel 21 such that a negative pressure is caused in the channel 21 because of the venturi effect.

As can be seen in FIG. 3, the second chamber 22 gets bigger in the rotation direction of the drive gearwheel 14, as was indicated with arrow P. Said channel 21 also connects to the end of the second chamber 22 as seen in the rotation direction P of the drive gearwheel 14, i.e. to its biggest end.

Both characteristics will ensure that said effect will be as optimal as possible.

The second chamber 22 extends from 0° to approximately 225° of the circumference of the drive gearwheel 14 in the rotation direction of arrow P, starting from the engagement of the gearwheels.

Preferably, the rest of the circumference of the drive gearwheel 14 forms a tight fit.

This will ensure that the vortex losses are reduced to a minimum.

As can be seen in FIG. 1, the second chamber 22 is connected to the filter element 16 that is connected to the transmission 4. This filter element 16, for example, can be a venting filter or a liquid separator that is provided with a filter.

Because the oil separation in the filter element 16 is always linked with a certain drop in pressure the result will be a positive pressure in the second chamber 22. This means extra vortex losses in the second chamber 22.

According to the form of the second chamber 22, as shown in FIG. 3, the reduction of the vortex losses by the tight fit of the drive gearwheel 14 and the extra vortex losses in the second chamber 22 due to pressure build-up over the filter element 16 will cancel each other out which means no extra power of the motor 3 is necessary.

The operation of the compressor 1 is very simple and as follows.

During the operation of the compressor 1 the motor 3 will power the drive gearwheel 14, whereby the movement via the driven gearwheel 11 is transferred to the driven shaft 9 of the compressor element 2.

Oil will be injected in the transmission 4 and possibly also the motor 3 for the cooling and/or lubrication of the gearwheels 11, 14, bearings and other parts.

The operation of the compressor 1 will result in a certain pressure build-up in the transmission 4, as the air seal 12b on the driven shaft 9 will allow a certain leakage flow in the direction of the compressor element 2 toward the transmission 4.

Consequently, in the housing 10 of the transmission 4 there will be an oil-air mixture at an increased pressure.

The rotation of the drive gearwheel 14 will create a so-called "gearwind" in the chamber 22 whereby an air flow or vortex is generated by the rotating teeth of the drive gearwheel 14.

By channeling this air flow along the channel 21 the venturi effect will cause a negative pressure in the channel 21.

As a result of this negative pressure, the first chamber 20 will be sucked out as it were and the oil-air mixture in this chamber will end up in the second chamber 22 via the channel 21.

This causes a pressure difference between the first chamber 20 and the second chamber 22, whereby the pressure in the first chamber 20 will be lower than the pressure in the second chamber 22.

The lower pressure in the first chamber 20 prevents the seals 12*a*, 12*b* on the driven shaft 9 from being exposed to too big a pressure difference, such that it is avoided that the oil-air mixture can end up in the compressor element 2.

The oil-air mixture ends up in the second chamber 22, where a pressure build-up will take place due to the drop in pressure over the filter element 16 after which the purified, oil-free air can be channeled out.

The oil separated in the filter element 16 can then be injected back into the transmission 4 and/or the motor 3 via the oil circuit 17.

Although in the shown example the second chamber 22 is provided around the drive gearwheel 14, it is not excluded that this chamber 22 is provided around the driven gearwheel 11 or another gearwheel, if present.

However, preferably this chamber 22 extends along the gearwheel 11, 14 or another gearwheel, if present, with the greatest diameter and/or the greatest peripheral speed.

As is visible in FIG. 3, the drive gearwheel 14 in this case is greater than the driven gearwheel 11 and the second chamber 22 is therefore also provided around the drive gearwheel 14.

The bigger gearwheel 14 will, after all, be able to create a greater gas flow, such that the negative pressure in the channel 21 is greater and a better extraction of the first chamber 20 is obtained.

According to the invention is it not necessary that it concerns a compressor 1 that is provided with a transmission 4 according to the invention. The machine could also be a vacuum pump.

The present invention is by no means limited to the embodiments described as an example and shown in the drawings, but a transmission according to the invention and a compressor or vacuum pump equipped with this can be realised in all kinds of forms and dimensions, without departing from the scope of the invention.

The invention claimed is:

1. A transmission between drive shaft and a driven shaft, which the transmission comprising a housing and at least a driven gearwheel that is mounted on the driven shaft and a drive gearwheel that is mounted on a drive shaft and engaged with the driven gear to drive the driven gear,
   wherein the housing comprises, a first chamber and a second chamber which is separated from the first chamber by a separating wall,
   wherein the first chamber is connected via a channel with the second chamber, wherein the driven shaft is at least partially disposed within the first chamber and the drive gearwheel or driven gearwheel is disposed within the second chamber, and
   wherein the form of the second chamber is such that when the gearwheel in question rotates a gas flow is created around this gearwheel which causes a negative pressure in the channel by the venturi effect, whereby an oil-air mixture in the first chamber is drawn via the channel into the second chamber.

2. The transmission according to claim 1, wherein the second chamber is integrated in the wall of the housing.

3. The transmission according to claim 1, wherein the second chamber extends along the gearwheel with the greatest diameter and/or the greatest peripheral speed.

4. The transmission according to claim 1, wherein the second chamber extends from 0° to 225° of the circumference of the gearwheel in question starting from the position of engagement of the gearwheels.

5. The transmission according to claim 1, wherein the second chamber extends over 25% to 75%, preferably even over 45% to 55% and even more preferably 50% of the circumference of the gearwheel in question.

6. The transmission according to claim 1, wherein the distance in a radial direction between the wall of the second chamber and the gearwheel in question gets bigger in the rotation direction of the gearwheel in question.

7. The transmission according to claim 1, wherein said channel connects to the end of the second chamber, as seen in the rotation direction of the gearwheel in question.

8. The transmission according to claim 1, wherein said second chamber is in connection with a filter element or the like connected to the transmission.

9. The compressor provided with a compressor element and a motor to drive the compressor element, wherein the compressor is provided with the transmission according to claim 1 between a drive shaft of the motor and a driven shaft of the compressor element.

10. The vacuum pump provided with a vacuum pump element and a motor to drive the vacuum pump element, wherein the vacuum pump is provided with the transmission according to claim 1 between a drive shaft of the motor and a driven shaft of the vacuum pump element.

* * * * *